Oct. 16, 1951

A. S. HARRIS 2,571,131

SWEEP CIRCUIT

Filed Jan. 21, 1946

INVENTOR
ALBERT S. HARRIS

BY [signature]

ATTORNEY

UNITED STATES PATENT OFFICE 2,571,131

SWEEP CIRCUIT

Albert S. Harris, Fort Wayne, Ind., assignor, by mesne assignments, to Farnsworth Research Corporation, a corporation of Indiana Application January 21, 1946, Serial No. 642,477

5 Claims. (Cl. 250—27)

This invention relates to sweep circuits, and more particularly relates to a sweep circuit arranged for developing a periodic sawtooth current wave which is utilized to produce an electromagnetic field for deflecting an electron beam.

It is conventional practice to deflect the electron beam developed in a cathode ray tube by means of a periodic electric or magnetic deflection field. Sweep circuits arranged for developing a sawtooth current wave for the magnetic deflection of an electron beam are used, for example, in television picture signal generating and reproducing tubes. Great difficulties have been experienced in conventional sweep circuits arranged for developing a sawtooth current wave because it has not been possible heretofore to prevent the introduction of transients, particularly at the beginning of the trace interval of the wave. The sawtooth current waves are caused to flow through an inductance element which may be the electron beam deflecting coil. An inductance element inherently has distributed and stray capacitances which, together with the inductance of the coil, form an oscillatory system. The abrupt changes of the first derivative of the sawtooth current wave introduce transients, particularly at the beginning of the trace interval. The portion of the trace interval upon which transients are superimposed can not be used for deflecting the electron beam thus decreasing the useful time duration of the trace interval.

It is the principal object of the present invention, therefore, to provide a sweep circuit for developing a periodic sawtooth current wave substantially without introducing transients at the beginning of the trace interval, thereby to increase the useful time duration of the trace portion of the wave.

A further object of the invention is to provide a scanning circuit including a vacuum tube for developing a sawtooth current wave of larger sweep amplitude with a given average current through the tube than has been possible in prior art circuits.

In accordance with the present invention a sweep circuit for developing periodic sawtooth waves having a trace and a retrace interval comprises a vacuum tube having input and output electrodes. A reactive output circuit is coupled to the output electrodes. Means are provided for applying to the input electrodes a periodic voltage wave to produce the sawtooth wave in the output circuit. The voltage wave includes pulses effective to bias the tube from the beginning of the retrace interval until the sawtooth wave has reached substantially a minimum. Preferably, the pulses of the voltage wave applied to the input electrodes have a time duration effective to bias the tube to substantially cut-off from the beginning of the retrace interval until the sawtooth wave is tangent to its trace portion. The point where the sawtooth wave is tangent to its trace portion is very close to the minimum of the wave.

For a better understanding of the invention, together with other and further objects thereof, reference is made to the following description, taken in connection with the accompanying drawing, and its scope will be pointed out in the appended claims.

Figure 1:
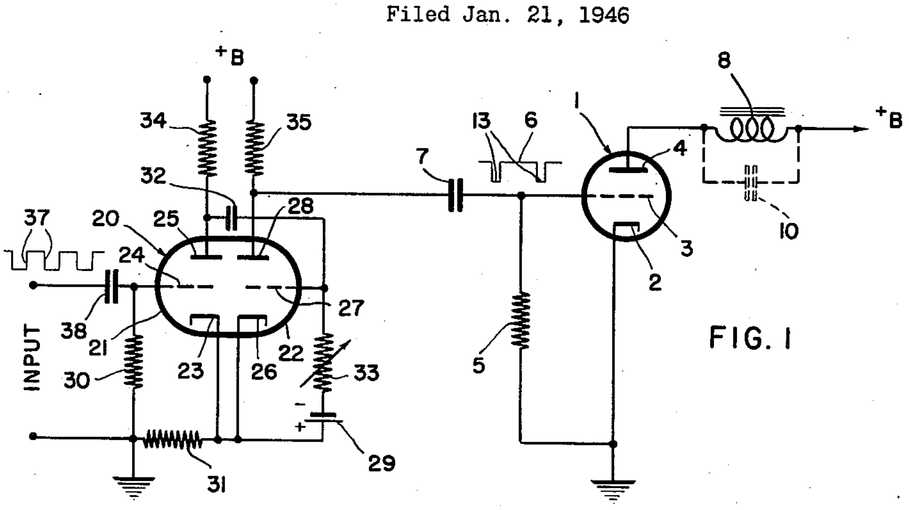
Fig. 1 is a circuit diagram of a sweep circuit embodying the present invention.

Referring now to Fig. 1, there is illustrated a sweep circuit comprising vacuum tube 1 which is preferably a triode as illustrated. Triode 1 comprises cathode 2, control grid 3 and anode 4. Cathode 2 is connected to ground as illustrated. Grid leak resistor 5 is provided between grid 3 and ground. Input signal 6 consisting of negative pulses 13 is impressed between grid 3 and cathode 2 through coupling condenser 7. The output circuit connected between anode 4 and cathode 2 comprises inductance element 8 connected to a positive anode voltage source indicated at B+. The distributed capacitance and stray capacitance of inductance element 8 including the interelectrode capacitance of triode 1 and the capacitance of the leads of coil 8 is indicated by condenser 10 shown in dotted lines.

Triode 1 is arranged to be normally conductive so that current flows from the anode voltage source B+ through inductance element 8 and triode 1 to ground. The output current flowing through inductance element 8 in dependence upon time is illustrated in the upper portion of Fig. 2. The output current comprises trace portions 11 and retrace portions 12. When triode 1 begins to conduct space current, the current flow through inductance element 8 increases at a rate determined by the tube characteristics of triode 1 and by the inertia of the resonant system represented by inductance element 8 and condenser 10.

Upon the arrival of a negative pulse 13 impressed upon control grid 3, triode 1 is biased beyond cut-off thus terminating the flow of space current through triode 1. The current through inductance element 8 now decays due to the inertia effects of the inductance of element 8 and the capacitance of condenser 10.

Figure 2:
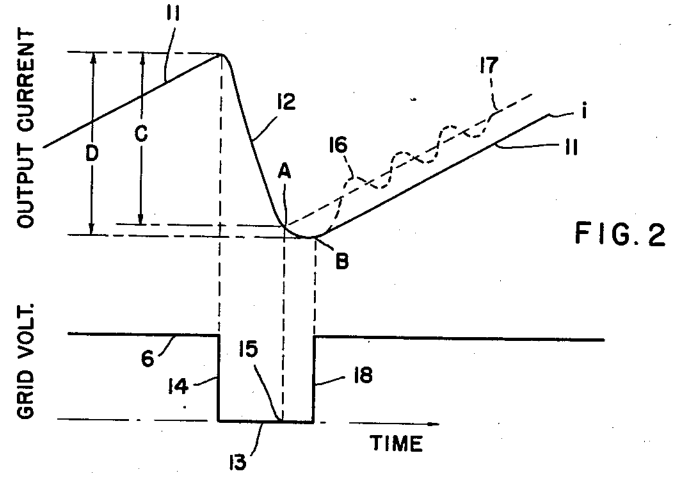
Fig. 2 illustrates the input voltage and the output current of a vacuum tube forming part of the sweep circuit of the invention.

This corresponds to the retrace interval of the sawtooth current wave illustrated by the curved portion 12 in Fig. 2.

In the prior art it has been suggested to make triode 1 conductive at a time corresponding to point A of sawtooth retrace portion 12. Input signal 6 illustrated below sawtooth current wave 11, 12 represents grid voltage impressed upon control grid 3. Input signal 6 includes negative pulses 13 having a leading edge 14 which occurs at the beginning of retrace portion 12 as illustrated. When negative pulse 13 is terminated at the point 15 corresponding to point A on sawtooth current retrace portion 12, the current through inductance element 8 will over-shoot, and a few transients or oscillations of damped waveform indicated in dotted lines at 16 are superimposed upon the beginning of trace portion 17. It will be apparent that the beginning of trace portion 17 can not be used for deflecting an electron beam until transients 16 have been sufficiently damped.

In accordance with the present invention the time duration or width of negative pulses 13 impressed upon control grid 3 is accurately controlled so that the trailing edge of the pulses occurs at the point 18. This corresponds to point B on retrace portion 12 which is substantially at or near the minimum of the sawtooth wave. Preferably the time duration of negative pulses 13 is such that the pulses are effective to bias triode 1 substantially to cut-off from the beginning of retrace portion 12 until the sawtooth wave is tangent to the desired trace portion 11. When retrace portion 12 of the sawtooth current wave has reached its minimum the rate of change or the first derivative of the wave equals zero. At this point or in the neighborhood thereof the sawtooth current wave may be given any desired slope, such as that of trace portion 11, without introducing transients.

Thus by controlling the time duration of grid pulses 13 in the manner explained the introduction of transients at the beginning of the trace interval of the sawtooth current wave is prevented. Accordingly, the useful time duration of trace portion 11 is increased. Furthermore, the current through inductance element 8 has a tendency to overshoot from point A to point B on retrace portion 12. By removing the cut-off bias from control grid 3 when the sawtooth current wave has reached the point B, the sweep amplitude of the current wave is increased by an amount represented by the difference between arrows D and C shown in Fig. 2. Thus, with the same average current flow through triode 1 a larger sweep amplitude may be obtained than has been possible with prior art circuits.

As explained hereinabove the time duration or width of negative input pulses 13 should be adjustable. For the purpose of developing negative pulses having a controllable width and having leading edges recurring at a predetermined time interval there may be provided, for example, multivibrator 20. Multivibrator 20 comprises tube sections 21 and 22 which may be arranged in a common envelope in the manner of a duplex tube. Tube section 21 comprises cathode 23, control grid 24 and anode 25, while tube section 22 includes cathode 26, control grid 27 and anode 28. Grid leak resistor 30 is arranged between control grid 24 and ground. Cathode resistor 31 is connected between both cathodes 23 and 26 and ground. Coupling condenser 32 connects anode 25 of tube section 21 to control grid 27 of tube section 22. Adjustable grid leak resistor 33 is arranged between control grid 27 and cathodes 23 and 26. Grid bias battery 29 is arranged in series with grid leak resistor 33 between cathode 26 and grid 27 for grid 27 normally biased to cutoff. Anode resistors 34 and 35 are provided between suitable anode voltage sources indicated at B+ and anodes 25 and 28, respectively. An input signal consisting of negative pulses 37 is impressed upon control grid 24 through coupling condenser 38.

Multivibrator 20 operates as follows. Tube section 21 comprising cathode 23, control grid 24 and anode 25 normally conducts space current. Tube section 22 comprising cathode 26, control grid 27 and anode 28 is normally biased to cut-off due to the action of grid bias battery 29. Thus tube section 21 normally conducts space current and continues to be conducting until a negative pulse 37 is impressed through coupling condenser 38 upon control grid 24 thus biasing it beyond cut-off. Thereupon the voltage of anode 25 begins to rise, and this positive potential change is impressed upon control grid 27 through coupling condenser 32. Now tube section 22 begins to conduct space current, while tube section 21 is nonconductive.

Gradually the positive charge impressed upon coupling condenser 32 is dissipated through adjustable grid leak resistor 33 until tube section 22 ceases to conduct space current. It will be observed that the time duration of the conduction period of tube section 22 is determined by the time constant of coupling condenser 32 and grid leak resistor 33. By adjusting resistor 33 the duration of the conduction period of tube section 22 may be adjusted. Alternatively grid bias battery 29 may be adjusted to vary the conduction period of tube section 22.

In the meantime the negative charge impressed upon condenser 38 is gradually dissipated through grid leak resistor 30. When the space current flowing through tube section 22 is terminated while tube section 21 is still non-conductive, the potential of cathode 23 drops to ground potential because there is no longer a current flow through cathode resistor 31. Accordingly, control grid 24 is now less negative with respect to cathode 23 and space current begins to flow again through tube section 21 until the next pulse 37 biases control grid 24 beyond cut-off.

Space current flowing through tube section 22 causes a voltage drop across anode resistor 35 which is impressed through coupling condenser 7 upon control grid 3 of triode 1. Input signal 6 then comprises pulses 13 of negative polarity as required. It will be seen that leading edge 14 of pulses 13 is determined by the leading edge of pulses 37 which control multivibrator 20. This is so because upon the arrival of a negative pulse 37 the space current through tube section 21 is terminated, while tube section 22 begins to conduct space current thus causing a voltage drop across anode resistor 35. As pointed out hereinabove the time duration of output pulses 13 of multivibrator 20 is determined by the time constant of coupling condenser 32 and grid leak resistor 33 and may be varied by adjusting resistor 33.

It is to be understood that any conventional means may be employed for supplying negative pulses 13 of adjustable time duration and impressing them upon control grid 3 of triode 1.

Figure 3:
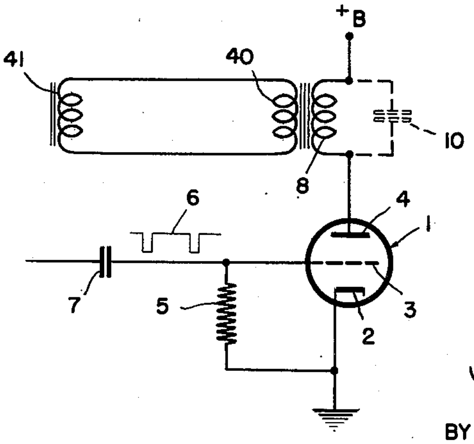
Fig. 3 is a circuit diagram of a modified sweep circuit in accordance with the invention.

Inductance element 8 may be utilized as the deflecting coil or pair of coils for developing a magnetic electron beam deflecting field. However, as illustrated in Fig. 3 in which like components are designated by the same reference numerals as were used in Fig. 1, it is also feasible to couple an inductance element 40 magnetically to inductance element 8 which is arranged in the plate circuit of triode 1. In that case a deflecting coil 41 or a pair of coils may be connected across inductance element 40. The arrangement illustrated in Fig. 3 has certain advantages because transformer 8, 40 facilitates matching of the output impedance of vacuum tube 1 to the impedance of deflecting coil 41. The output current may be stepped up or stepped down as required through transformer 8, 40. The sweep circuit operates in the same manner as described in connection with Fig. 1 by impressing input signal 6 of adjustable pulse width upon control grid 3 through coupling condenser 7.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A sweep circuit for developing periodic sawtooth waves having a trace and a retrace interval comprising an electronic tube having a cathode an input electrode and an output electrode, an output circuit including an inductance element coupled between said cathode and said output electrode which decreases the rate of change of current through said tube during the later portions of said retrace intervals until said sawtooth wave becomes tangent to its trace portions, and means for applying to said input electrode periodic rectangular voltage pulses of negative polarity to produce a sawtooth current through said inductance element, said pulses having a time duration and amplitude effective to bias said tube substantially to cut-off at the beginning of said retrace interval until the slope of said sawtooth current is tangent to the slope of the desired trace portion.

2. A sweep circuit for developing periodic sawtooth waves having a trace and a retrace interval comprising a triode vacuum tube having a cathode an input electrode and an output electrode, a reactive output circuit coupled between said cathode and said output electrode which decreases the rate of change of current through said triode during the later portions of said retrace interval until said saw-tooth wave reaches a maximum value, and means for applying between said cathode and said input electrode periodic rectangular voltage pulses of negative polarity to produce said sawtooth wave in said output circuit, said pulses having a duration and amplitude effective to bias said tube to cut off from the beginning of said retrace interval until said sawtooth wave has reached said minimum.

3. A sweep circuit for developing periodic sawtooth waves having a trace and a retrace interval comprising a vacuum tube having a cathode, an input electrode and an output electrode, means for rendering said tube normally conducting during said trace intervals, an inductive device coupled between said cathode and said output electrode which maintains substantially constant the rate of change of current in said tube during trace intervals and which decreases the rate of change of current during the later portions of said retrace interval until said saw-tooth wave becomes tangent to its trace portions, and means for impressing upon said input electrode a series of pulses each having an amplitude, polarity and a duration effective to bias said tube to cutoff from the beginning of said retrace interval until said saw-tooth current is tangent to its trace portion.

4. A sweep circuit for developing periodic sawtooth waves having a trace and a retrace interval comprising a vacuum tube having a cathode, an input electrode and an output electrode, means for rendering said tube normally conducting during said trace intervals, an inductive device coupled between said cathode and said output electrode which maintains substantially constant the rate of change of current in said tube during trace intervals and which decreases the rate of change of current during the later portions of said retrace interval until said saw-tooth wave becomes tangent to its trace portions, and means for impressing between said cathode and said input electrode a series of pulses each having steep leading and trailing edges, a polarity and a duration effective to bias said tube to cutoff from the beginning of said retrace interval until said saw-tooth current is tangent to its trace portion.

5. A sweep circuit for developing periodic sawtooth waves having a trace and a retrace interval comprising a vacuum tube having a cathode, an input electrode and an output electrode, means for rendering said tube normally conducting during said tace intervals, an inductive device coupled between said cathode and said output electrode which maintains substantially constant the rate of change of current in said tube during trace intervals and which decreases the rate of change of current during the later portions of said retrace interval until said saw-tooth wave becomes tangent to its trace portions, and means for impressing between said cathode and said input electrode a voltage wave consisting of pulses of a polarity and amplitude effective to bias said tube to cutoff from the beginning of said retrace interval until said saw-tooth current is tangent to its trace portion.

ALBERT S. HARRIS.

REFERENCES CITED

The following references are of record in the file of this patent:

UNITED STATES PATENTS

| Number | Name | Date |
|---|---|---|
| 2,177,162 | Wilson | Oct. 24, 1939 |
| 2,224,116 | Schlesinger | Dec. 3, 1940 |
| 2,227,480 | Andrieu | Jan. 7, 1941 |
| 2,244,003 | Eaglesfield et al. | June 3, 1941 |
| 2,264,781 | Wheeler | Dec. 2, 1941 |
| 2,280,990 | White | Apr. 28, 1942 |
| 2,300,524 | Roberts | Nov. 3, 1942 |
| 2,302,161 | Woerner | Nov. 17, 1942 |
| 2,344,745 | Somers | Mar. 21, 1944 |
| 2,396,476 | Schade | Mar. 12, 1946 |